United States Patent [19]

Wallace et al.

[11] 4,248,702
[45] Feb. 3, 1981

[54] STRATIFIER DISCHARGE CONTROL

[75] Inventors: Walter M. Wallace, Carlisle; Geoffrey F. Craven, Bradford, both of England

[73] Assignee: Norton-Harty Colliery Engineering Limited, United Kingdom

[21] Appl. No.: 64,788

[22] Filed: Aug. 8, 1979

Related U.S. Application Data

[63] Continuation-in-part of Ser. No. 868,931, Jan. 12, 1978, Pat. No. 4,176,749.

[30] Foreign Application Priority Data

Jan. 15, 1977 [GB] United Kingdom ................. 1659/77
Apr. 30, 1977 [GB] United Kingdom ............... 18172/77

[51] Int. Cl.$^3$ ............................................... B03B 5/20
[52] U.S. Cl. .................................... 209/455; 209/491; 209/500
[58] Field of Search ............................... 209/454–457, 209/490, 491, 494–496, 500, 502

[56] References Cited

FOREIGN PATENT DOCUMENTS

| | | | |
|---|---|---|---|
| 505424 | 9/1951 | Belgium | 209/457 |
| 517862 | 3/1953 | Belgium | 209/502 |
| 478628 | 1/1938 | United Kingdom | 209/496 |
| 486958 | 6/1938 | United Kingdom | 209/496 |
| 796409 | 6/1958 | United Kingdom | 209/457 |

Primary Examiner—Ralph J. Hill
Attorney, Agent, or Firm—Parmelee, Miller, Welsh & Kratz

[57] ABSTRACT

A wash box for separating materials produced in, for example a mining operation, into fractions of different densities. The machine is divided vertically into compartments, including at least one stratification compartment and at least one reject compartment, the raw material being delivered onto the grid, the level of water in the compartments being higher than the grid. Vertical pulsations are applied to the water in the compartments, causing the water to travel through the perforations of the grid. The pulsations applied to the stratification compartment are effective to stratify the material on the grid, movement of the water through the wash-box tending to carry the lighter fraction from the wash-box while the pulsations applied to the reject compartment determine the rate at which the heavier fraction reject material falls from the grid plate into a reject extraction chamber adjacent to the reject compartment. The pressure produced in the stratification compartment upon the application thereto of each stratifying pulse, and which is dependant upon the quantity of the heavier fraction on the grid over the stratification compartment, is measured by sensing means, and this measurement is used to control the amplitude of the pulsations applied to the reject compartment. Valves applying the pulsations to the stratification and reject compartments are driven by a common drive means, and the frequency at which the pulsations are applied to the reject compartment is higher than, preferably at integral multiple of, the frequency at which pulsations are applied to the stratification compartment. In this manner, the maximum rate of which reject material may be removed from the grid may be considerably extended and, by a finer control of the amplitude of the pulsations applied to the reject compartment, this may be achieved without any significant reduction in the efficiency of separation.

8 Claims, 10 Drawing Figures

STRATIFIER DISCHARGE CONTROL

This application is a continuation-in-part of Ser. No. 868,931 filed Jan. 12, 1978, now U.S. Pat. No. 4,176,749 issued Dec. 4, 1979.

BACKGROUND OF THE INVENTION

1. Field of the Invention

This invention relates to the separation of materials, produced for example by a mining operation, into fractions of different densities.

2. Description of the Prior Art

In for example the mining of coal, a mixture of coal and shale is produced from the face being mined, and it is necessary to separate the coal from the shale by the use of automatic machinery. Conventionally used for this operation is a wash box (hereinafter referred to as "a wash box of the kind specified") essentially in the form of a vessel divided vertically into a stratification compartment and a reject compartment, with a perforate grid plate extending across upper parts of the compartments. The vessel is filled to a level above the grid plate with a liquid, such as water, and the raw material is deposited on the grid plate at one side, flow of water across the grid plate tending to carry the material across the grid plate.

Means is provided to cause generally vertical pulsations in the liquid in the two compartments, disturbing the raw material on the grid plate, causing the heavy material (the shale) to sink to the bottom adjacent to the grid plate, and the lighter material (coal) to rise to the top. Conventionally, the means to cause the pulsations is provided by a conduit, opening into both the stratification and reject compartments, along which air under pressure is delivered intermittently, the delivery of the pulses to the stratification compartment coinciding with the delivery of pulses to the reject compartment. Thus, as the raw material moves across the grid plate, and in particular across that part of the grid plate extending over the stratification compartment, the raw material is stratified. The heavier material adjacent to the grid plate passes beneath a gate or sill located a short distance above the grid plate, onto that part of the grid plate which extends over the reject compartment, whilst the lighter fraction passes over the gate and from the wash box through a primary outlet. The pulsations applied to the reject compartment lift the material on the grid plate, and cause it to pass over a wall or wier from the reject compartment into an adjacent reject extract chamber.

In such wash boxes, it is necessary to control the thickness of the layer of the heavier material on the grid plate in the stratification compartment so as to ensure reliable separation of materials. If the layer of the heavy material becomes too thick, particles of the heavier fraction will pass out with the lighter material over the gate or sill. Conversely, if the layer of the heavier material is too thin, particles of the lighter fraction will be discharged into the reject extraction chamber with the heavier material.

Thus, it has been proposed in a wash box of the kind specified to sense the thickness of the layer of the heavier material in the stratification compartment and, when a reduction in the thickness of this layer is required, to increase the amplitude of the pulsations being applied to the reject compartment so that the particles of heavier material will pass over the wier and fall into the reject extraction chamber at a greater rate. Conversely, when the layer of the heavier material in the stratification compartment falls below a predetermined level, the amplitude of pulsations applied to the reject compartment may be decreased, reducing the rate at which the particles of heavier material pass over the wier.

In all previous constructions, such control of the amplitude of the pulsations being applied to the reject compartment has been carried out by the use of valves, which are adjustable to vary the effect of the intermittent delivery of air pressure pulses.

However, in all previous constructions of wash box of this kind, the frequency at which pulsations are applied to the reject compartment is equal to the frequency at which the pulsations are applied to the adjacent stratification compartment, albeit the amplitude of the former pulsations may be varied between zero and a maximum.

One conventional method of measuring the thickness of the layer of heavier material on the grid plate is by the use of a float which rests on the top surface of the heavier material, and the position of the float has been used to control the pulsations applied to the reject compartment.

Alternatively, since the pressure which is generated in the stratification compartment will be dependant upon the weight of raw material resting on the grid plate, proposals have been made to connect a vertical tube to the stratification compartment from beneath the grid plate, into which liquid from beneath the grid plate flows, and to sense the mean or average position of the surface of the liquid within this tube by the use of mechanical means which includes a float in the tube, thereby providing an indication of the thickness of the layer of the heavier material. Thus, the position of the float may be used to control the amplitude of the pulsations applied to the reject compartment.

Alternatively, electrodes within such a tube have been used to sense when the level of the liquid within the tube rises to a Predetermined point (corresponding to an undesirably high thickness of heavier material on the grid plate) to cause an increase in the amplitude of the pulsations applied to the reject compartment, or to sense when the level of liquid within the tube falls below a predetermined point (corresponding to an undesirably small thickness of the heavier material on the grid plate) to cause a decrease in the amplitude of the pulsations applied to the reject compartment.

When coal was extracted manually from the face being worked, the raw material would contain a relatively small proportion of reject materials of a heavier density, for example, ten per cent of the raw material would be shale. However, even with the use of coal cutting machinery, until recently coal seams which have been worked have been relatively thick, and of a reliable nature. Thus, it was possible to use the coal cutting machine in a manner such that the proportion of reject materials of heavier density cut from the face with the coal was still relatively small, although usually higher than the figure which was obtained with manual extraction.

However, there is in present times a tendency to work seams of decreasing reliability, involving at times the cutting of predominantly reject material, and to work seams of shallower depth, and/or over and undercutting to an extent which ensures that all the coal is removed, despite the increase in reject material which will necessarily be produced at the same time.

Thus, not only is the reject content of the raw material becoming increasingly higher (often up to seventy per cent) but also the proportion of reject material may vary considerably over relatively short periods of time.

Present techniques for controlling the operation of wash boxes of the kind specified have heretofore become insufficiently accurate, and have produced difficulty in ensuring that a minimum of reject material is included in the coal, and in ensuring that a minimum of coal is included in the reject material.

SUMMARY OF THE INVENTION

According to this invention there is provided a wash-box comprising a vessel divided vertically into water-containing compartments, including at least one stratification compartment and a reject compartment adjacent to the stratification compartment, a perforate grid plate extending across upper parts of the compartments, the wash-box comprising first pulsation means associated with the stratification compartment and which is operative to produce a cyclic rise and fall in the water in the stratification compartment, said pulsations being effective generally to stratify the material on the grid plate above the stratification compartment, and second pulsations means associated with the reject compartment and which is operative to produce cyclic rise and fall in the water in said reject compartment, the pulsations applied to the reject compartment determining the rate at which the heavier fraction of reject material falls from the grid plate into a reject extractionchamber adjacent to the reject compartment, sensing means associated with the stratification compartment and which is responsive to the pressure produced in the stratification compartment on the application thereto of each pulse, and control means associated with the second pulsation means and which is operative to vary the pressure of the pulsations applied to the reject compartment in accordance with the response of the sensing means, the improvement where in the frequency at which the pulsations are applied to the reject compartment is a multiple greater than one of the frequency at which the pulsations are applied to the stratification compartment.

Thus, although if necessary (for example in the absence of a significant quantity of reject material) the amplitude of the pulsations applied to the reject compartment may be zero, by virtue of the higher frequency at which the pulsations are applied to the reject compartment, the maximum rate of which reject material may be fed into the reject extraction chamber may be greatly increased. This is particularly advantageous where the raw material fed onto the grid plate contains a high proportion of reject material, for example in circumstances where the proportion of reject material is in excess of fifty percent.

Advantageously the frequency at which the pulsations are applied to the reject compartment is an integral multiple greater than one of the frequency at which the pulsations are applied to the stratification compartment, and preferably each pulsation applied to the stratification compartment coincides with a pulsation applied to the reject compartment.

Conveniently the wash-box comprises an air pressure line extending to the vessel by which air under pressure may be applied both to the stratification compartment and to the reject compartment, the first and second pulsation means comprising respective first and second rotary control valves which are driven by a common drive means of the wash-box, the second control valve differing from the first control valve, in that for each rotation thereof, it causes a number of pulsations to be applied from the airline to the reject compartment which differs from the number of pulsations caused to be delivered to the stratification compartment from the air line by an equivalent rotation of the first control valve.

Advantageously the first and second valves each comprise a housing and a rotary valve member mounted in the housing and which is driven by said common drive means, the frequency at which the control valves cause pulsations to be applied to their respective compartments is determined by the number of delivery ports provided in the valve member.

Preferably the control means comprises a third, conveniently variable orifice, valve associated with the reject compartment, and which is operative in response to the sensing means to restrict the pressure of the pulsations caused to be applied to the reject compartment in the operation of the second valve means.

Where the invention is applied to a compound wash-box, comprising two or more vessels of the kind set out above, material from the first vessel, from which a substantial proportion of reject material has been removed, passing onto the grid plate of the second vessel for a further stratification and separation operation, the differential between the pulsations applied to the stratification compartment and the reject compartment of the first vessel may be different from that between the pulsations applied to the stratification compartment and the reject compartment of the second vessel. This is particularly important, since the parameters under which the second vessel is operating, namely that it has fed onto the grid plate thereof material from which a significant proportion of reject material has already been removed. Thus the pulsation differential may be adjusted to provide the wash-box with optimum capability of removing further reject material, without undue loss of the lighter fraction which is to be retained.

BRIEF DESCRIPTION OF THE DRAWINGS

The various aspects of the present invention will be described, by way of example only, with reference to the accompanying drawings in which.

DESCRIPTION OF THE PREFERRED EMBODIMENT

The wash box which is the preferred embodiment of this invention is a compound wash box, comprising a vessel indicated generally at 10 intended to contain water and through which a mixture of coal and shale passes, which is separated in the water. The mixture of coal and shale enters the vessel at one end through a chute 11 and the lighter material, which is at least predominently coal, leaves at the other end through a chute 12 providing a primary outlet for the coal.

Figure 1:
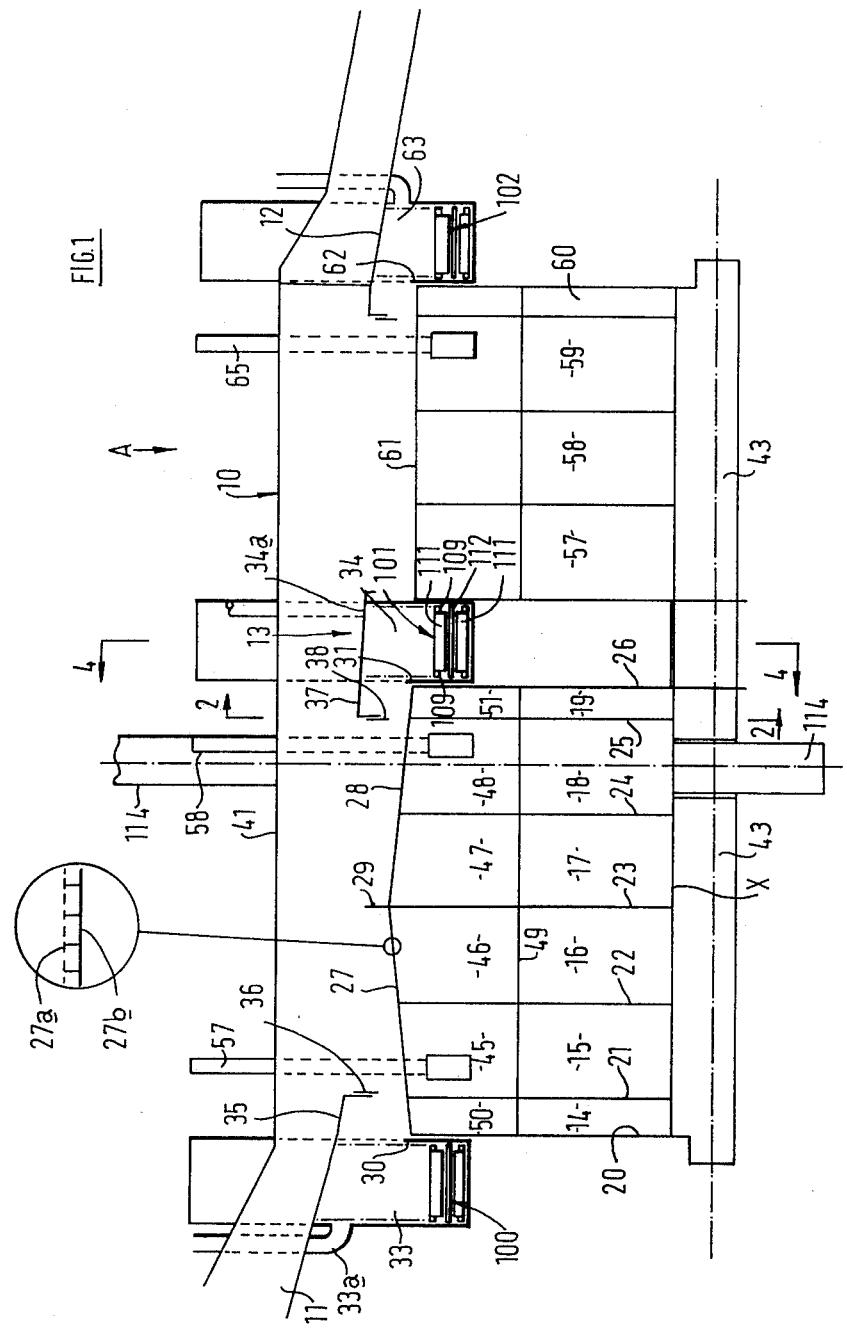
FIG. 1 is a longitudinal section through a wash-box embodying the invention.

The left side of the vessel is divided into six compartments 14–19 by walls 20–26, the wall 26 forming the lefthand wall of the dividing assembly 13 (see FIG. 1). The compartments 15–18 constitute stratification compartments whereas compartments 14 and 19 constitute reject compartments. Supported on the upper ends of the walls 20, 21, 22 and 23 is a perforated grid plate 27 which slopes downwardly from the wall 23 to the wall 20. Similarly a perforated grid plate 28 is supported on the upper ends of the walls 23,24,25 and 26 and which slopes downwardly from the wall 23 to the wall 26. The wall 23 has an upper end portion 29 which extends above the grid plates 27 and 28. Both grid plates comprise a framework 27b supporting sheet mesh 27a. At its lefthand end the grid plate 27 has a weir plate 30 and at its righthand end the grid plate 28 has a weir plate 31. Advantageously, the weir plates are adjustable in height. A downwardly extending reject extraction chamber 33 leads from behind the weir plate 30 (on the left side, FIG. 1) and a downwardly extending reject extraction chamber 34 leads from behind the weir plate 31 (on the right side, FIG. 1). The lefthand end of the grid plate 27 is overhung by a feed sill 35 having an adjustable gate member 36. Similarly, the righthand end of the grid plate 28 is overlapped by an outlet sill 37 having an adjustable gate member 38.

Similarly, the right side of the vessel is divided into four compartments 57–60, constituting three stratification compartments (57,58,59) and a reject compartment (60). Extending above these compartments is a perforated grid plate 61. At its righthand end, the grid plate 61 is provided with a weir plate 62, over which material may flow from the grid plate into a reject extraction chamber 63.

The compound wash box which is the preferred embodiment of this invention thus comprises three basic wash box sections arranged in series, one section being provided by the reject extraction chamber 33, the reject compartment 14 and the stratification compartments 15 and 16 a second section being provided by the stratification compartments 17 and 18, the reject compartment 19 and the reject extraction chamber 34, and the third section being provided by the stratification compartments 57,58 and 59, the reject compartment 60 and the reject extraction chamber 63.

Figure 2:
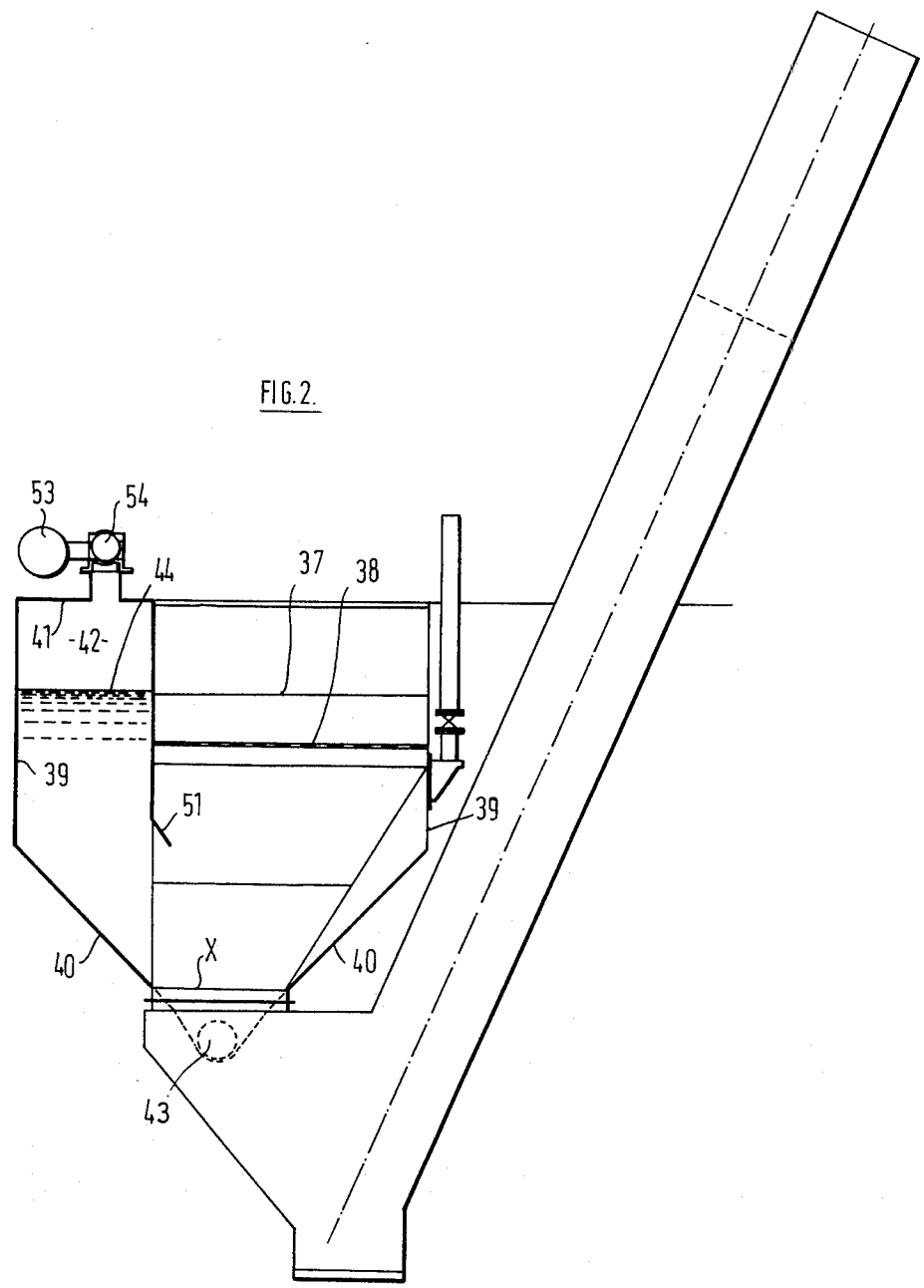
FIG. 2 is a section on the lines 2—2 of FIG. 1.

The vessel has vertical side walls 39 and converging bottom walls 40 (see FIG. 2). Extending inwardly from the lefthand side wall 39 is a cover plate 41. Between each pair of adjacent walls 20,21: 21,22: 22,23: 23,24: 24,25: 25,26: partition plates 50: 45: 46: 47: 48: 51 extend, thus making each compartment of U-shaped cross-section as shown in FIG. 2. The partition plates co-operate with the cover plate 41 and in conjunction with the lefthand side wall 39, form a compression chamber at the top of the lefthand limb of each compartment, such as the chamber 42 of the compartment 19 in FIG. 2.

limbs of the compartments from each other from below the grid plates to the lower edges of these walls indicated at X in FIGS. 1 and 2.

The compression chamber of each compartment is provided with a separate rotary valve 14'-19' and 57'-60' (see FIG. 3) which is connected to a compressed air conduit 53. These rotary valves are each arranged periodically to connect their respective compression chamber with the conduit 53 thus applying pressure to the water in the associated compartment. All the rotary valves 14' to 19' and 57' to 60' are driven from a common drive shaft 52, the valves 14', 19' and 60' being arranged to cause the water in the reject compartments 14 and 19 and 60 to pulsate at a frequency higher, e.g. twice or three times, than the frequency of pulsation of the water in the stratification compartments 15 to 18 and 57 to 59.

Additionally variable orifice valves 14'',19'' and 60'' are provided between the rotary valves 14', 19' and 60' and the compressed air conduit 53 to control the pressure of air supplied to the valves 14', 19', 60' in order to enable the amplitude of the pulsations applied to the compartments 14, 19 and 60 to be varied.

During the operation of the wash box, air under pressure is admitted into the compression chambers of the compartments 15 to 18 by the valves 15' to 18', and causes the water therein to pulsate. As the water pulsates, passing upwardly and downwardly through the grid plate, it stratifies the material delivered by the feed chute 11 as it passes over the gride plates 27 and 28 so that the lighter material, which in the separation of coal and shale will be the coal, passes over the outlet sill 37 whilst the heavier material, which will normally be shale, either settles on the grid plates 27 or 28 or, if too small to be supported, passes through the grid plates and falls to the bottom of the compartments where it is picked up by a screw conveyor 43. The shale on the grid plates 27 and 28 passes over the weir plates 30 and 31 into the extraction chambers 33 and 34 and is removed by conveyors indicated at 100 and 101 respectively.

Meanwhile, material comprising predominently coal passes over the outlet sill 37 and is deposited on to the grid plate 61, where it is once again stratified by the action of the water in the stratification compartments 57, 58 and 59, the shale falling predominently close to the grid plate, ultimately passing over the weir plate 62 into the reject extracion chamber 63, whilst coal and water passes through the primary outlet provided by the chute 12.

The level of the shale on the grid plate above the stratification compartment 15 is sensed by means of a pipe 57 extending outwardly from the stratification compartment, and upwardly therefrom. Since pressure is applied to the water in the stratification compartment from below, resistance to flow of water through the perforated grid plate will produce an increase in the pressure within the pipe 57, and thus the level which the water in the pipe reaches during each pulsation of the stratification compartment 15 will indicate the quantity of material, and in particular the quantity of heavier material, resting on the grid plate above the stratification compartment 15.

In the preferred embodiment, whilst the frequency of pulsations applied to the reject compartment 14 are fixed in relation to the frequency at which pulsations are applied to the stratification compartment 15, and are greater than the rate of which pulsations are applied to the stratification compartment, means is provided to enable the amplitude of the pulsations applied to the reject compartment to be varied, depending upon the quantity of material resting on the grid plate above the adjacent stratification compartment 15, and as indicated by the height reached by water within the pipe 57.

Similarly, control over the amplitude of the pulsations applied to the reject compartment 19 and 60 is excercised, in accordance with the quantity of material resting on the grid plate 28 above the stratification compartment 18, and on the grid plate 28 above the stratification compartment 59. For this purpose, a pipe 58 extends upwardly from the stratification compartment 18 and a pipe 65 extends upwardly from the stratification compartment 59.

Figure 5:
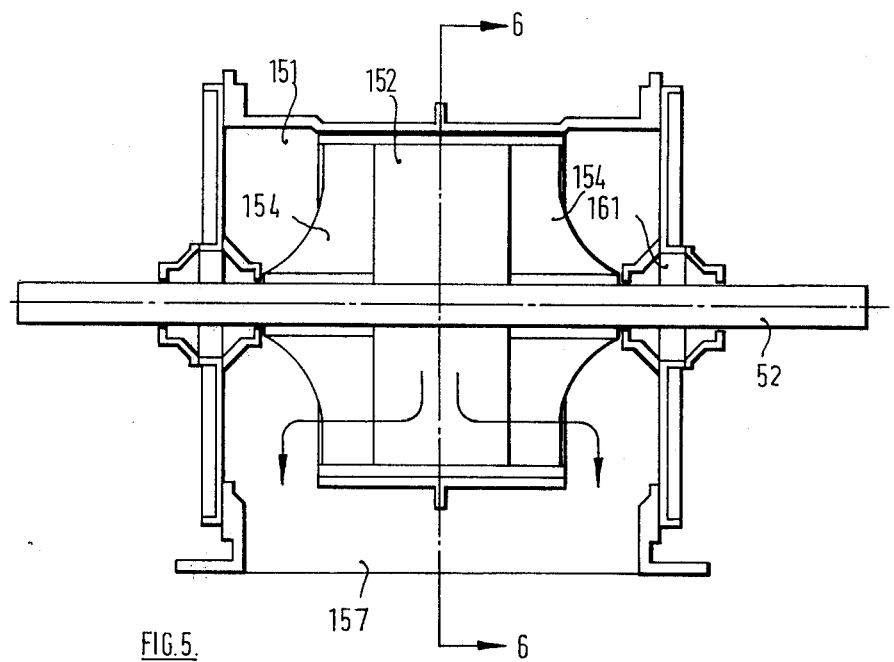
FIG. 5 is a radial section through an air valve of the wash box.
Figure 6:
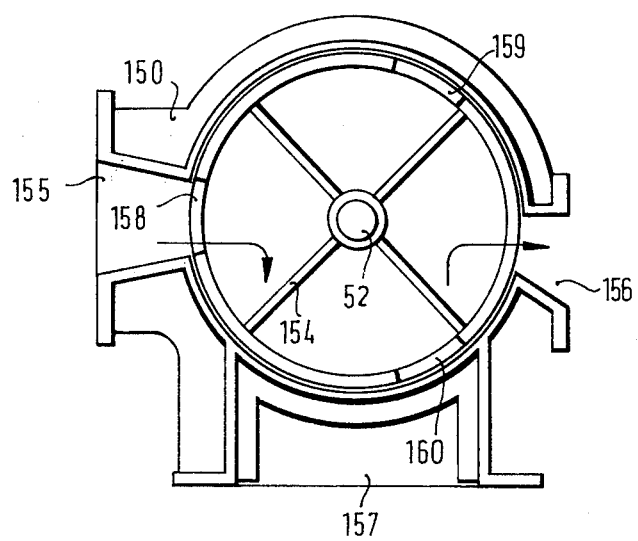
FIG. 6 is a section on the line 6—6 of FIG. 5.

The rotary air control valves 14', 19' and 60', by which pulses of pressurised air supplied to the compression chambers of the reject compartments 14, 19 and 60, are similar, and are illustrated in detail in FIGS. 5 and 6.

Each valve comprises a housing 150 having an internal chamber 151 in which a hollow cylindrical valve member 152 is mounted for rotation on the common shaft 52, which is rotatable through bearing 161 supported by the housing.

The chamber 151 is provided with an inlet port 155, an outlet port 156 and a delivery port 157 which is arranged to be connected with the compression chamber of the associated reject compartment. The valve member 152 is provided with three circumferentially spaced openings 158, 159 and 160. Each of these openings is arranged to register with the inlet port and the exhaust port in turn as the valve member is rotated.

The valve member is supported on the shaft 52 by two spiders 154 so that the ends of the valve member are open and, as can be seen from FIG. 5, the interior of the valve member is thus in permanent communication with the delivery port 157.

With the opening 158 in register with the inlet port 155 the interior of the valve member 152 and thus the delivery port 157 is connected with the pressurised air line 53 by way of the inlet port 155. A pulse of high pressure air is thus supplied to the associated compression chamber, the duration of this pulse being dependant on the speed of rotation of the valve member and the size of the opening 158.

With the valve member rotating clockwise as viewed in FIG. 6, the opening 158 will move from register with the inlet port 155 so that pressurised air is not longer supplied to the delivery port 157. After the connection between the opening 158 and the inlet 155 has been closed, the opening 159 registers with the exhaust port 156 so that the pressurised air in the compression chamber can be exhausted to atmosphere by way of the hollow interior of the valve member 152.

The opening 160 will next register with the inlet port 155 thus again connecting the delivery port 157 with the pressurised air supply. Next the port 158 will register with the exhaust port 156 again connecting the delivery port with the exhaust port.

The sequence of operation of the valve is completed by the opening 159 registering with the inlet port 155 and the opening 160 resistering with the exhaust port 156.

Thus during each rotation of the valve member 152 the delivery port 157 is connected three times to the inlet port 155 and three times to the exhaust port 156.

The number of pulsations of pressurised air which the valve supplies per revolution can readily be altered by varying the number of openings in the valve member. For example, two, four or five pulsations per revolution could be provided by employing two, four or five openings in the valve member.

The compression chambers of the stratification compartments of the wash box shown in FIG. 1 to 4 are supplied with air under pressure by valves 15'-18' and 57' to 59' of the general form shown in FIGS. 5 and 6 but having fewer openings. Thus, in the preferred embodiment, the frequency of pulsations of the air applied to the reject compartments is higher than the frequency of the pulsations of the air applied to the stratification compartments.

Since the rotary control valves for the various reject compartments and stratification compartments are rotated at the same speed by the common drive shaft 52, the frequency at which pulsations are applied to the compression chambers of said compartments is maintained in strict relationship. In particular, in view of the construction of control valves preferably used, the frequency at which pulsations are applied, say, to the compression chamber of the reject compartment 14, is an integral multiple greater than 1 of the frequency at which the pulsations are applied to the compression chamber of the stratification compartment 15 associated with said reject compartment 14.

In use, the valves 15' to 18' and 57' to 59' will normally be arranged to pulsate the stratification compartments 15 to 18 and 57 to 59 at the same frequency.

Additionally, since all the valves are fed from the common air line 53, the pressure at which the various valves apply pulsations to the various compartments may be equal, but may be varied by the operation of hand-valves.

The compound wash box which is the preferred embodiment of this invention comprises, for each of the pipes 57, 58 and 65, a control mechanism operative, inter alia, to control the amplitude of the pulsations applied to the reject compartment associated with the stratification compartment from which said pipe extends. The three control mechanisms are similar, and for simplicity, only one will now be described.

Basically, the control mechanism comprises an emitter for emitting a beam in wave form along the pipe towards the water therein, the beam travelling along the pipe and being reflected from the surface of the water therein, and a receiver responsive to the reflected beam. Conveniently, the beam is transmitted in the form of short, discrete pulses.

The control mechanism also comprises a timing device for measuring the time interval between the instant of transmission and the reception of the echo reflected from the air/water boundary, and an output device adapted to provide an output signal dependent upon said time.

Whilst the beam may be of electromagnetic radiation, in view of the short distances involved, more conveniently the beam is in the form of high frequency sound radiation. Additionally, for convenience, both the emitter and the receiver are provided by a single ultrasonic transducer, conveniently in the form of a piezo-electric crystal, which when energised acts as a transmitter, and which is capable of vibrating in response to the echo, means being provided to sense the vibrations induced in the transducer, when acting in this mode.

The control mechanism associated with the pipe 57 will now be described, but it is to be understood that similar control mechanisms will be mounted on the pipes 58 and 65.

Figure 9:
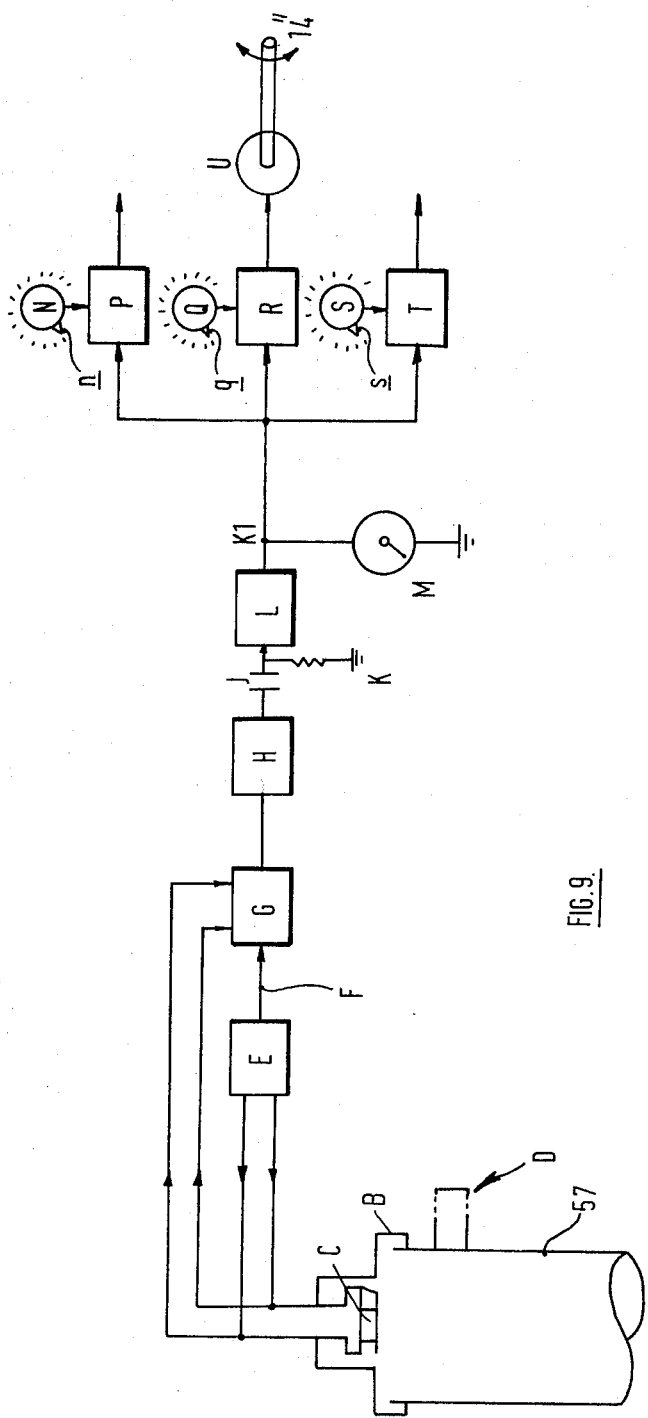
FIG. 9 is an enlarged view, illustrating schematically one of the control mechanisms of the preferred embodiment.

The upper end of the pipe 57 is closed by a cap B which carries an ultrasonic transducer C (see FIG. 9). To avoid ingress of dust whilst avoiding compression of air within the pipe, a breather tube having an air filter D is provided. The transducer C is cut from a plate of piezo-electric material having a natural resonant frequency of approximately 40 kilo-hertz. The crystal is provided with electrodes on its parallel faces to facilitate connection to an external electric circuit.

The control mechanism comprises an oscillator E designed to apply to the transducer a continuous train of narrow voltage pulses, typically of one microsecond duration, and at a repetition rate determined by calculation of the maximum distance to be measured and the velocity of sound in air. Each pulse applied to the crystal causes the transducer to resonate briefly, and to propogate a small pulse of acoustic energy through the air in the pipe 57 towards the water. On meeting the air/water boundary, a proportion of the transmitted energy is reflected back up the pipe, at its original velocity, and on impinging on the transducer is converted back into a small electrical pulse.

For the purpose of measuring the transit time to and from the water surface, each pulse transmitted from the oscillator E is also made to switch a bi-stable element in the receiver G through a connection line F. The returned pulse is amplified in receiver G, and reswitches the bi-stable element. Thus, the time during which the bi-stable element is in its "switched" condition is equal to the transit time of the pulse of energy to and from the water surface. Thus, the output from the receiver G will be in the form of a square wave pulse having a mark:space ratio proportional to the instantaneous height of water in the pipe 57. Since the oscillatory movement of the water in the pipe 57 is approximately sinusoidal, the change in mark:space ratio of a sequence of pulses emitted from receiver G will also be approximately sinusoidal.

The square wave pulses emitted by receiver G are fed to a converter H which integrates the area bounded by the positive part of pulses fed to it. Thus, the converter H generates a sinusoidal voltage wave form whose peak to peak amplitude is proportional to the peak height of water in the pipe 57.

The rate at which the transducer transmits pulses into the pipe 57 is greatly in excess of the frequency at which pulsations are applied to the stratification compartment 15, and since the quantity of material on the grid plate 27 above the compartment 15 controls the maximum pressure occurring within the compartment 15, it is necessary to measure the peak height reached by the water within the pipe 57.

Figure 10:
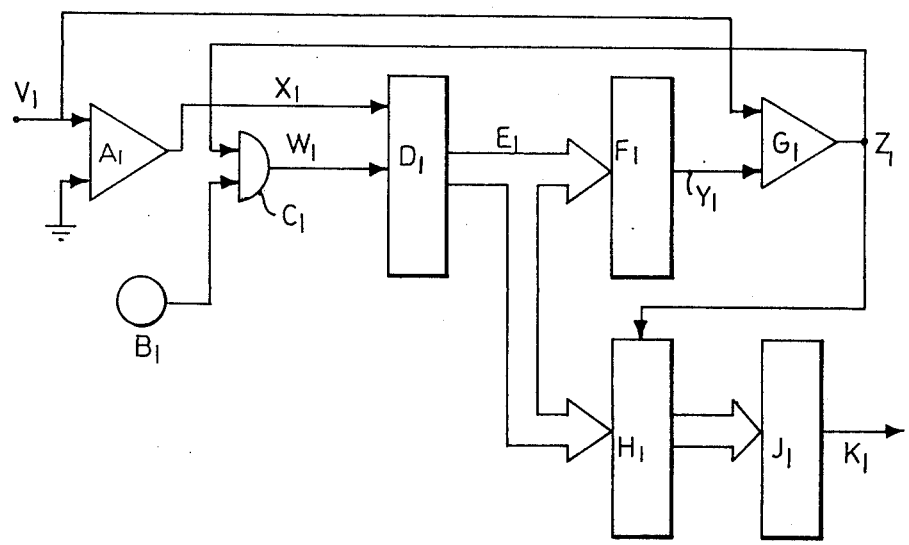
FIG. 10 is a detailed view of an element illustrated in Fig. 9.
Figure 7:
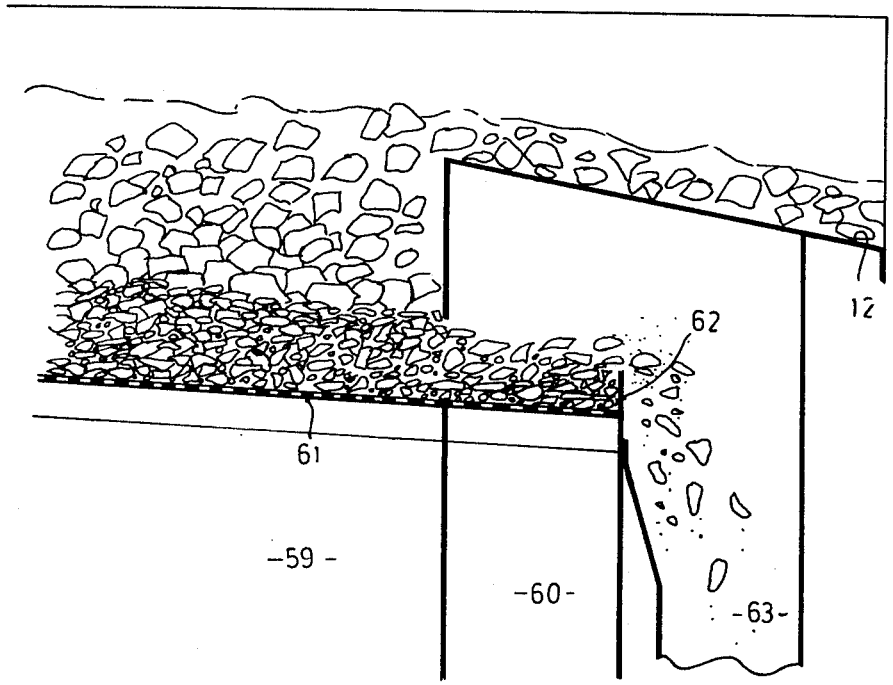
FIG. 7 is an enlarged view, illustrating schematically heavier material passing from the grid plate into a reject extraction chamber, and the lighter material passing from the wash box through a primary outlet.
Figure 8:
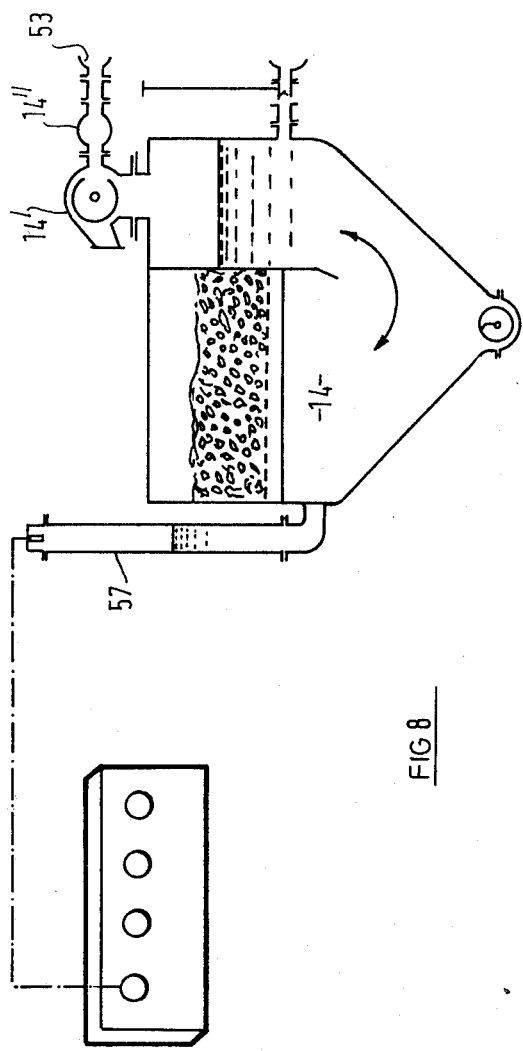
FIG. 8 is a schematic side elevation, illustrating an operational control of the wash box.

To effect this, the output from the converter H is fed to a capacitor J, whose second terminal is connected to a point of zero potential through a resistor K. The values of capacitance and resistance are chosen such that there is no atenuation of the sound wave over the range of frequencies encountered. The second terminal of capacitor J is also connected to a box L, shown in more detail in FIG. 10.

The alternating voltage at the second terminal of capacitor J is applied, through line V1 to one terminal of a differential comparitor A1, referred on its second input to zero potential. As long as the input voltage is negative with respect to zero potential, the comparitor has a logical 0 at its output which, through line X1, disables a binary counter D1. At the instant when the input to A1 becomes positive with respect to zero potential, line X1 switches state from logical 0 to logical 1 and initiates operation of the binary counter D1.

An oscillator B1 receives clocks pulses through AND gate C1, which clock pulses are counted by the binary counter. The frequency of the oscillator B1 and the number of stages in the counter are determined by the resolution required, N binary stages giving a resolution 2 to the N-1 digits. An output from each counter stage is taken to a weighted resistor network F through multiple lines E, the network being supplied from a source of constant voltage and being arranged so that the voltage developed across the network is a linea function of the binary number in the counter. The voltage output from the resistor network is taken to one input of a second differential comparitor G1 through line Y1, the second input of the comparitor G1 being the zero referred sign wave fed to the comparitor A1. As long as the voltage on V1 is more positive than the output from F1, comparitor G1 has logical 1 at its output, maintaining the AND gate C1 open and maintaining an increasing count in D1.

At the peak of the voltage sign wave however, the voltage commences to decrease so that line V1 becomes less positive than F1 output, which causes G1 to change state at its output to logical 0. This action closes AND gate C1, preventing further counting by the counter D1, and also opens digital latches of box H1.

Box H1 contains the same number of latches as there are counter stages in the binary counter D1, and when these are opened, the box H1 assumes the logical states on the counter outputs, providing a memory. A second weighted resistor network J1, which is identical to the network F1, is connected to box H1 and produces an output voltage on line K1 which is equal to the peak value of the sign wave.

At the instant when line B1 becomes negative, comparitor A1 reverts to its original state, the logical 0 at its output resetting counter D1, but because the latches of box H1 are unaffected, the peak value continues to be present at K1. Thus, during each sign wave cycle, the peak value is determined and held until updated during succeeding cycles.

It will be noted that the peak amplitude of only one half of each cycle is measured, but this is permissible since the symmetry of the positive and negative halves is equal.

Advantageously, a suitably calibrated meter is connected to line K1, to indicate the peak height attained by the water in the pipe 57. Additionally, line K1 is connected to a comparitor R, which is also referred to a calibrated voltage source Q, the latter being set such that the reference voltage is equal to the desired peak movement of water in the pipe 57, and consequently at the desired weight of raw material on the grid plate 27 above the stratification compartment 15.

At equality, when the voltage on line K1 equals the reference from source Q, the output of the comparitor R is zero, and no alteration to the pulsations applied to the reject compartment 14 is effected. However, when the voltage on K1 becomes more positive than the reference, a positive output from R to servo-motor U causes the servo-motor to drive the variable orifice valve 14" (FIG. 9) increasing the pressure at which air is delivered to the rotary valve 14', and causing the amplitude of the pulsations applied to said reject compartment to increase comensurately, causing movement of shale across the grid plate 27 from right to left (FIG. 1) more quickly, increasing the rate at which shale is fed over the weir plate 30 into the shale extraction chamber 33.

Conversely, a decrease in the voltage on line K1 produces a negative output fom R, which causes the servo-motor U to close the valve 14″, causing a comensurate reduction in the amplitude of the pulsations applied to the reject compartment 14, decreasing movement of shale across the grid plate 27, and decreasing the rate at which such shale is fed into the extraction chamber 33.

The control mechanism also comprises means to prevent overloading from occuring, in the event that the shale content of the incoming raw material is considerably high, and/or the rate at which the raw material itself is delivered into the wash box is unduly high. For this purpose, the control mechanism comprises a comparitor P which has as its reference source a voltage N set to be considerably higher than that derived from Q, so that when the voltage on line K1 exceeds N, comparitor B switches external mechanism to reduce the rate of input of raw material into the wash box, or if necessary to terminate such feed, and if desired to sound an alarm.

Additionally, the control mechanism comprises means to minimise under-utilisation of the wash box in the event that the shale content of the raw material is small, and/or the rate at which raw material is fed into the wash box is reduced. For this purpose, a comparitor T is provided which has as its reference a voltage derived from a source S, which is set at a level lower than that of Q, so that a decrease in the peak water level below that which indicates a lower level of utilisation of the wash box causes comparitor T to switch external apparatus to increase the input, and/or to sound an alarm.

In the event that it is desired to vary the desired level of shale on the grid plate (for example if higher or lower qualities are required of the output material) the reference signal supplied by Q may be varied, by an adjustable control q. Similarly, the reference signals supplied by sources N and S may also be varied, by adjustable controls n and s respectively.

Conveniently, means is provided for comparing the output signal at comparitor R of the three control mechanisms, so that in the event of a divergance in the comparative levels of these beyond, for example, a predetermined level, an alarm signal would be sounded. Such a divergence may be caused by e.g. a blockage of the path for the reject material into the shale extraction chamber 34 or the shale extractor chamber 63.

During operation of the compound wash box, the larger pieces of reject material fall over the weir plates 30, 31 and 62 into the reject extraction chambers defined by the conveyors 100, 101 and 102. These three conveyors are substantially identical in construction, differing if desired in size, and only the central conveyor 101 will be described in detail.

Figure 3:
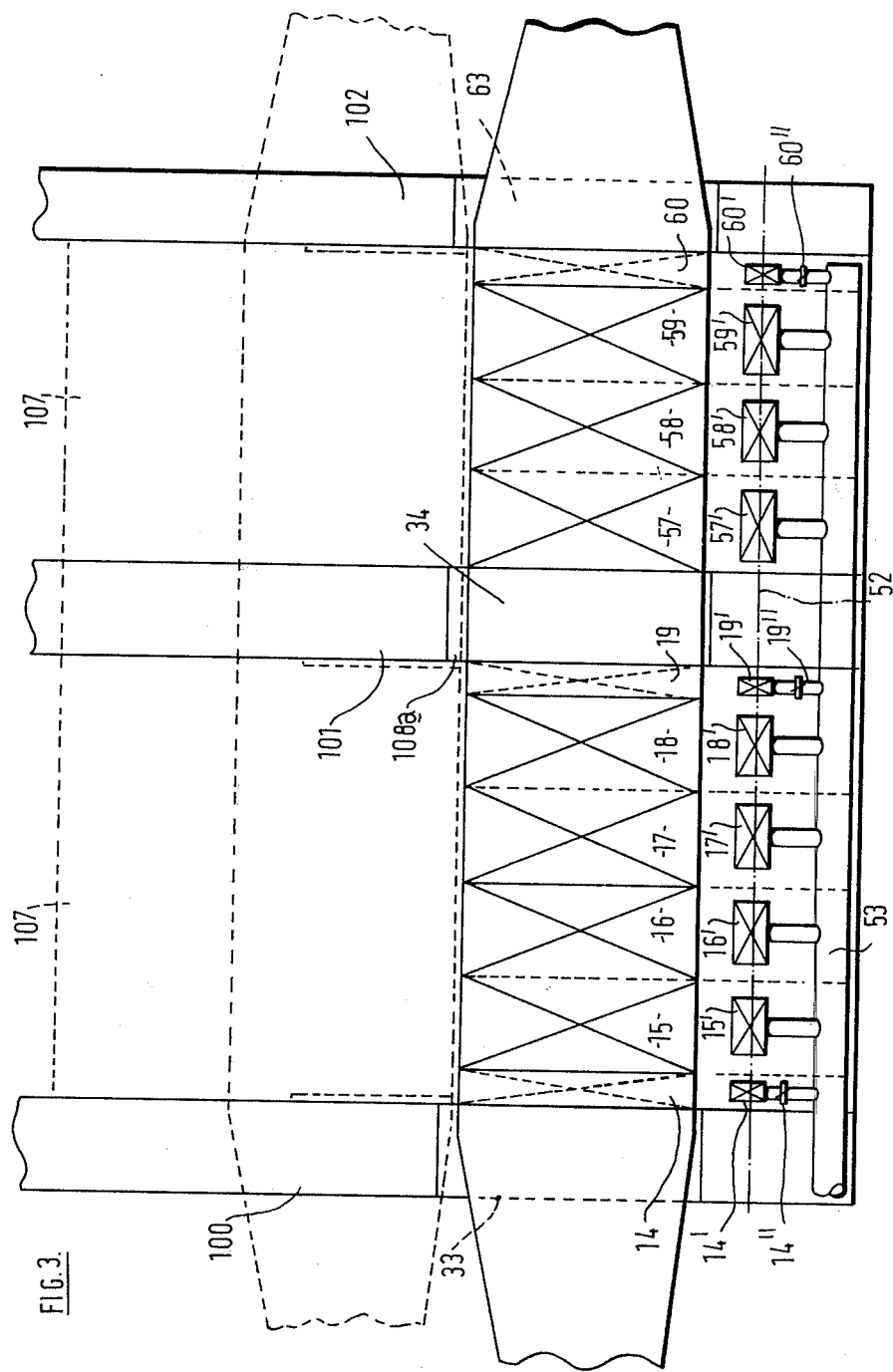
FIG. 3 is a plan view in the direction of the Arrow A of FIG. 1 on a reduced scale.
Figure 4:
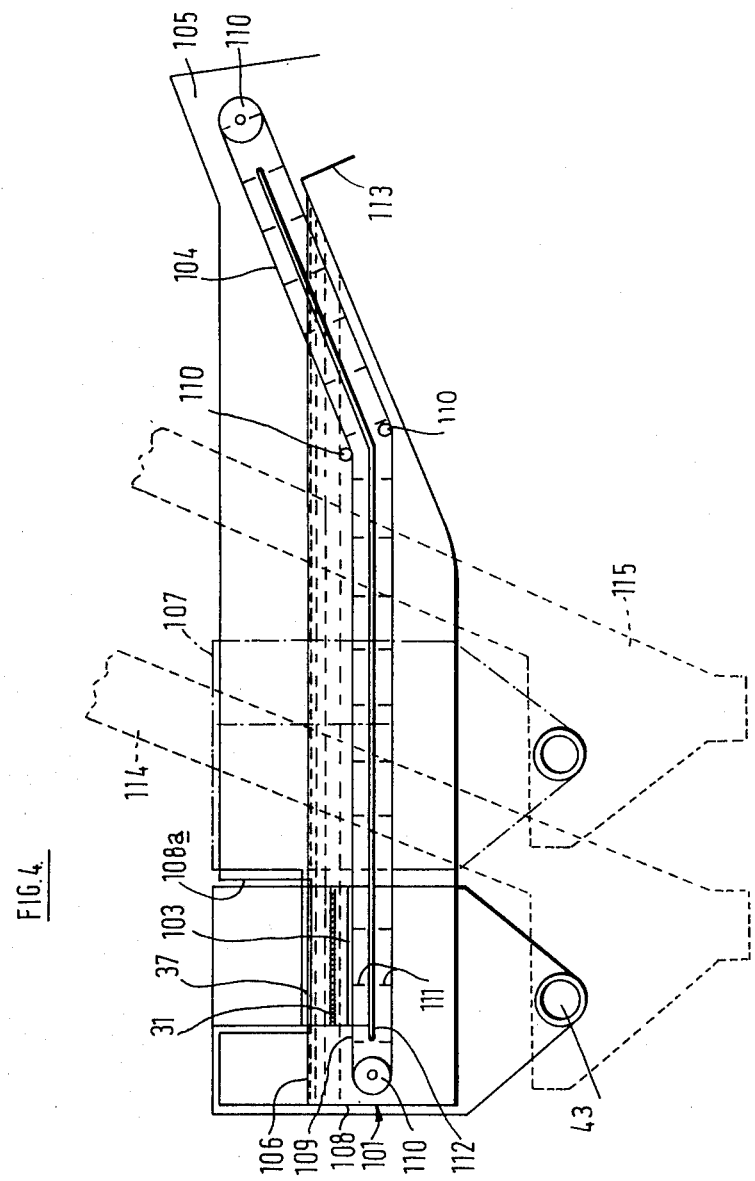
FIG. 4 is a section view on the line 4—4 of FIG. 3.

Referring to FIG. 4, the conveyor 101 has a conveying path with a substantially horizontal part 103 which is positioned below the weir plate 31 and which extends substantially parallel thereto, and a further part 104 which rises up to a discharge point 105 which is above the upper level of liquid in the washbox which is indicated at 106 in FIG. 4. The horizontal part of the conveying path as shown in FIG. 4 is in fact sufficiently long to enable a second compound wash box shown in dotted outline 107 in FIGS. 3 and 4 to discharge onto the same horizontal part of the conveyor 101. If only the washbox shown in full lines in FIGS. 3 and 4 is to discharge onto the conveyors 100, 101 and 102 then the horizontal parts of the conveyors will be reduced appropriately in length.

The conveyor 101 comprises a casing 108 which contains water up to the level 106. The casing is stepped at 108a to pass under the outlet sill 37. The sides and base of this step are closed and water-tight, the remainder of the top of the casing being open. If a second wash box 107 is to be used (this would be placed in a back-to-back relationship with the washbox shown in full lines in FIGS. 3 and 4) then the size of the step 108a will be enlarged accordingly.

Inside the casing 108 two continuous chain loops 109 are provided which are supported on appropriate sprockets 110. Between these two chain loops scraper blades 111 are supported so as to provide a conventional scraper-type chain conveyor.

The top run of the conveyor is arranged to be the live conveying run and the material which is discharged over the weir plate 31 falls onto a division plate 112 provided in the casing 108 which extends along the entire length of the conveyor to the discharge point 105 and along which the material is dragged by the plates 111. When the material reaches the discharge point 105 it is discharged from the conveyor via a chute outlet 113 onto a further conveyor (not shown) which receives the outlets from all the conveyors 100, 101 and 102.

On the return run of the conveyor the scraper blades travel beneath the division plate 112 as can be seen from FIGS. 1 and 4.

In the washbox arrangement shown in FIGS. 1 to 4 the smaller pieces of the heavier fraction of the material are conveyed from the bases of the reject and stratification compartments 14 to 19 and 57 to 60 using two screw conveyors 43, rotating in opposite directions which are arranged to discharge onto a single substantially central elevator means 114. The elevator means may be in the form of a bucket elevator, but may be of other form, e.g. an air lift or pump. Since the volume of material which is discharged from the bases of the reject and stratification compartments is only a small fraction of the total of the reject material discharged from the washbox, this central elevator means 114 can be of an appreciably smaller capacity than is conventionally used.

In the use of the washbox which is the preferred embodiment of this invention, in the event that material fed onto the grid plate 27 of the first section of the compound washbox, by the way of the chute 11, contains a large proportion of reject material (for example, in excess of fifty percent), this will be sensed immediately by the control means associated with the stand pipe 57, which in turn will be operative to open fully the variable orifice valve 14″ associated with the reject compartment 14. By virtue of the greater number of delivery ports of the rotary control valve 14″ compared with the rotary control valves 15 and 16, associated with the adjacent stratification compartments, an extremely violent agitation is caused in the reject compartment 14, which is effective to cause reject material to be fed from the grid plate 27 over the weir plate 30, into the reject extraction chamber at a great rate, and in particular at a rate far greater than that which could be achieved in a conventional washbox, in which the frequency at which pulsations are applied to the reject compartment is equal to the frequency at which pulsations are applied to the adjacent stratification compartment.

It will of course be appreciated that, in the setting up of the rotary control valve 14', care will be taken to ensure that, when a pulsation is delivered by the adjacent rotary control valve 15', this coincides with a pulsation delivered by the control valve 14', to reduce interference between the sinusoidal movement of the water in the compartments 14 and 15.

It will be appreciated that, in a change in the content of the material fed on the grid plate 27, this is immediately sensed by the control mechanism associated with the standpipe 57, and this in turn immediately alters the variable orifice valve 14". Thus, immediately the quantity of reject material on the grid plate 27 decreases, a compensatory control would be effected on the variable orifice control valves 14".

It will be appreciated that, by virtue of the ease with which the rate at which pulsations are delivered by the rotary control valves 14', 19' and 60', the relationship between the rates of pulsations applied to each of the stratification compartments 15,18 and 59 and their associated reject compartments 14,19 and 60 may be changed, as may be desired to provide the wash box with optimum separative performance, in accordance with the type of material fed onto the wash box along the chute 11. Thus, whereas it might be desired under certain circumstances to utilise, as rotary control valve 14', one which delivers pulsations at three or four times the rate at which pulsations are delivered by the rotary control valve 15', in order to obtain a removal of a considerable quantity of reject material at an initial separative stage, it might be desirable to utilise as rotary control valve 19' one which applies pulsations at a rate somewhat less than that effected by the valve 14', for example one which pulsates at twice the rate at which the adjacent valve 18' pulsates. Further, it might under certain circumstances be desirable to utilise as rotary control valve 60', one which delivers pulsations to the reject compartment 60 at a rate equal to that at which pulsations are applied to the adjacent stratification compartment 59 by the control valve 59'. In this manner, traversing the wash box in the direction of feed of raw material (left to right, FIG. 1), the maximum rate at which reject material is delivered to the reject extraction compartment reduces, whilst the sensitivity of separation increases. Thus it is for example possible to reduce the content of reject material from in excess of 50%, to less than 2%, with a minimum loss of coal with the reject material.

We claim:

1. In wash-box comprising a vessel divided vertically into water-containing compartments, including at least one stratification compartment and a reject compartment adjacent to the stratification compartment, a perforate grid plate extending across upper parts of the compartments, the wash-box comprising first pulsation means associated with the stratification compartment and which is operative to produce a cyclic rise and fall in the water in the stratification compartment, said pulsations being effective generally to stratify the material on the grid plate above the stratification compartment, and second pulsation means associated with the reject compartment and which is operative to produce cyclic rise and fall in the water in said reject compartment, the pulsations applied to the reject compartment determining the rate at which the heavier fraction of reject material falls from the grid plate into a reject extraction chamber adjacent to the reject compartment, sensing means associated with the stratification compartment and which is responsive to the pressure produced in the stratification compartment on the application thereto of each pulse, and control means associated with the second pulsation means and which is operative to vary the pressure of the pulsations applied to the reject compartment in accordance with the response of the sensing means, the improvement where in the frequency at which the pulsations are applied to the reject compartment is a multiple greater than one of the frequency at which the pulsations are applied to the stratification compartment.

2. A wash-box according to claim 1 wherein the frequency at which the pulsations are applied to the reject compartment is an integral multiple greater than one of the frequency at which the pulsations are applied to the stratification compartment.

3. A washbox according to claim 1 wherein each pulsation applied through the stratification compartment coincides with a pulsation applied to the reject compartment.

4. A wash box according to claim 1 comprising an air line pressure extending through the vessel, both by which air under pressure may be applied to the stratification compartment and to the reject compartment, the first and second pulsation means comprising respective first and second rotary control valves which are driven by a common drive means of the wash box, the second control valve differing from the first control valve, in that for each rotation thereof, it causes a number of pulsations to be applied from the air line to the reject compartment which differs from the number of pulsations caused to be delivered to the stratification compartment from the air line by an equivalent rotation of the first control valve.

5. A washbox according to claim 4 wherein the first and second control valves each comprise a housing and a rotary valve member mounted in the housing and which is driven by said common drive means, the frequency at which the control valves cause pulsations to be applied to their respective compartments, being determined by the number of delivery ports provided in the valve member.

6. A wash box according to claim 4 wherein the control means comprises a third valve associated with the reject compartment, which is operative in response to the sensing means to restrict the pressure of the pulsations caused to be applied to the reject compartment in the operation of the second valve means.

7. A wash box according to claim 6 wherein said third control valve is a variable orifice valve.

8. A washbox for the separation of materials of differing densities, being a compound washbox comprising two or more washbox sections according to claim 1, and in which material from the first section, from which a substantial proportion of reject material has been removed, is passed onto the grid plate of the second section, the improvement wherein the differential between the pulsations applied to the stratification and reject compartments of the first section are different from the differential between the pulsations applied to the stratification and reject compartments of the second section.

* * * * *